(12) United States Patent
Dziduch et al.

(10) Patent No.: US 11,012,457 B1
(45) Date of Patent: May 18, 2021

(54) BUILDING SECURITY ANALYSIS SYSTEM WITH SITE-INDEPENDENT SIGNATURE GENERATION FOR PREDICTIVE SECURITY ANALYSIS

(71) Applicant: Johnson Controls Technology Company, Auburn Hills, MI (US)

(72) Inventors: Marcin Dziduch, Cork (IE); Abdul Razak, Cork (IE); Conor Joseph Donovan, Cork (IE)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 16/685,646

(22) Filed: Nov. 15, 2019

(51) Int. Cl.
*G06F 11/00* (2006.01)
*H04L 29/06* (2006.01)
*G06F 21/55* (2013.01)
*G06F 16/2453* (2019.01)
*G06K 9/46* (2006.01)
*G06Q 10/06* (2012.01)

(52) U.S. Cl.
CPC .... *H04L 63/1425* (2013.01); *G06F 16/24537* (2019.01); *G06F 21/55* (2013.01); *G06K 9/4676* (2013.01); *G06Q 10/06* (2013.01); *H04L 63/1416* (2013.01); *H04L 63/20* (2013.01)

(58) Field of Classification Search
CPC . H04L 63/1425; H04L 63/1416; H04L 63/20; G06F 16/24537; G06F 21/55; G06K 9/4676; G06Q 10/06
See application file for complete search history.

(56) References Cited

U.S. PATENT DOCUMENTS

| 6,552,647 | B1* | 4/2003 | Thiessen | G05B 15/02 |
| | | | | 122/448.1 |
| 7,260,844 | B1* | 8/2007 | Tidwell | G06F 21/577 |
| | | | | 726/22 |
| 8,056,130 | B1 | 11/2011 | Njemanze et al. | |
| 8,234,704 | B2 | 7/2012 | Ghai et al. | |
| 8,294,566 | B2* | 10/2012 | Morwood | G08B 25/08 |
| | | | | 340/514 |
| 9,111,088 | B2 | 8/2015 | Ghai et al. | |
| 10,313,379 | B1* | 6/2019 | Han | G06N 5/04 |
| 2009/0276843 | A1 | 11/2009 | Patel | |
| 2012/0317306 | A1* | 12/2012 | Radinsky | H04L 63/1408 |
| | | | | 709/235 |

(Continued)

*Primary Examiner* — Munear T Akki
(74) *Attorney, Agent, or Firm* — Foley & Lardner LLP (57) ABSTRACT

The present disclosure relates to a network-based centralized security monitoring (CSM) system. An example CSM includes one or more memory devices configured to store instructions thereon that, when executed by one or more processors, cause the one or more processors to receive a plurality of parameter data elements comprising one or more characters for a plurality of parameter types from a monitored site, determine for each of the plurality of parameter types a number of occurrences of a plurality of different character groups in the plurality of parameter data elements, generate a count structure indicating the number of occurrences of the plurality of different character groups in the plurality of parameter data elements for each of the plurality of parameter types, and generate a security signature for the monitored site, the security signature comprising the count structure for each of the plurality of parameter types.

20 Claims, 4 Drawing Sheets

(56) References Cited

U.S. PATENT DOCUMENTS

| | | | |
|---|---|---|---|
| 2018/0276278 A1* | 9/2018 | Cagan | G06N 5/022 |
| 2019/0196938 A1* | 6/2019 | Mathen | G06F 11/366 |
| 2019/0258783 A1* | 8/2019 | Mehta | G06F 21/16 |

* cited by examiner

| Parameter Name | Description |
| --- | --- |
| Event names | A count of all unique events captured during given time period represented as bag-of-words (BOW) |
| Event ID | A count of all unique event IDs captured during given time window represented as BOW |
| Service type | A count of all unique service type IDs captured during given time window represented as BOW |
| System type | A count of the alarm panel type represented as BOW |
| Number of alarms | The total count of unique alarm numbers registered during a specified time window |
| Number of zones affected | The total count of unique zones that have registered activity |
| Total police dispatches | Count of the total number of police dispatches during a specified time window |
| Labels | Count of additional labels represented as BOW |

205 — Parameter Name column
210 — Description column

BUILDING SECURITY ANALYSIS SYSTEM WITH SITE-INDEPENDENT SIGNATURE GENERATION FOR PREDICTIVE SECURITY ANALYSIS

BACKGROUND

The present disclosure relates generally to the field of predictive security analysis and anomaly detection of a network-based, centralized security monitoring system. The present disclosure relates more particularly to generating a fixed length, site-independent representation of events occurring at a site of the centralized security monitoring system during an observation period.

Often, much of the event data that a security system or an alarm panel generates for events occurring at a site do not give rise to alarms. For example, when a user successfully disarms a building alarm before or upon entering the building, the alarm panel triggers an event without raising an alarm. Conventional network-based, centralized security monitoring centers respond only to events which give rise to alarms, and do not use the events that do not give rise to alarms. There is a need to provide a way for the unused events to be utilized to generate a representation that provides an understanding of all the security events taking place at a particular site.

Furthermore, much of the event data generated at a site is structured in a way that the data may be in free-text format (in other words, a lot of the event data may be full of text or string data). Hence, the event data is not in a suitable format to be readily processed by machine learning algorithms running on server computers. There is a need to find a representation of the free-text data in a format that is suitable for server computers to process more easily (and to allow further analysis of the event data by providing the representation of the data as an input to machine learning algorithms, for example).

SUMMARY

One implementation of the present disclosure is a security monitoring system with the security system including one or more memory devices configured to store instructions thereon that, when executed by one or more processors, cause the one or more processors to receive parameter data elements for parameter types from a monitored site. Each of the parameter data elements include one or more characters. The one or more processors are also caused to determine for each of the parameter types, a number of occurrences of different character groups in the parameter data elements of each of the parameter types, generate a count structure for each of the parameter types, the count structure indicating the number of occurrences of the different character groups in the parameter data elements for one of the parameter types, and generate a security signature for the monitored site. The security signature includes the count structure for each of the parameter types.

In some embodiments, the instructions cause the one or more processors to receive event data from the monitored site, the event data being collected from one or more sensors at the monitored site, calculate a zone count of a number of affected zones of the monitored site experiencing activity based on the event data and cause the security signature to include the zone count.

In some embodiments, the security signature further comprises an alarm count field indicating a number of alarms occurring at the monitored site.

In some embodiments, the count structure for each of the plurality of parameter types is a bag-of-words (BOW) data structure.

In some embodiments, the count structure for each of the plurality of parameter types represents a number of times that a particular event represented by the one or more characters occurred at the monitored site during an observation period.

In some embodiments, the observation period is either a first number of hours, a second number of days, or a third number of weeks.

In some embodiments, the instructions cause the one or more processors to other security signatures, each of the other security signatures associated with one of other monitored sites, execute a machine-learning algorithm on the security signature and other security signatures to predict one or more events over a future observation period, and store the one or more events predicted over the future observation period in an event database.

In some embodiments, the one or more events indicate equipment failure, wherein the instructions cause the one or more processors to determine one or more predictive maintenance actions to perform to prevent the one or more events, and store the one or more predictive maintenance actions in the event database.

In some embodiments, the instructions cause the one or more processors to communicate signals to one or more sensors in the monitored site to change one or more operational parameters of the one or more sensors.

In some embodiments, the instructions cause the one or more processors to retrieve a prediction for a current observation period from the event database, compare the prediction with one or more actual events occurring during the current observation period to determine whether the prediction is different than the one or more actual events, and send an indication of the prediction being different than the one or more actual events to an external monitor.

In some embodiments, the instructions execute a machine-learning algorithm based on the indication of the prediction being different than the one or more actual events.

In some embodiments, a centralized security monitoring (CSM) system includes one or more monitored sites, each monitored site including one or more alarm panels and a sensors coupled to the one or more alarm panels, with the sensors configured to capture sensor data representative of events detected at the monitored site by the sensors over an observation period, one or more server computers, each server computer including a signature generation circuit configured to receive data for the observation period from the one or more monitored sites. At least one of the one or more monitored sites provides the data in a non-standardized format dependent on the one or more alarm panels in the one or more monitored sites. Each server computer is also configured to generate a standardized data representation of fixed length from the data as a security signature for each monitored site belonging to the one or more monitored sites, and send the standardized data representation for each monitored site to an external monitor.

In some embodiments, the system further includes the standardized data representation including fields representative of all possible events occurring in the one or more monitored sites.

In some embodiments, the standardized data representation further comprises a bag-of-words (BOW) counter for each field of the fields, wherein each field represents an event occurring in one of the one or more monitored sites over the observation period and the bag-of-words counter represents the number of times that the event occurred during the observation period.

In some embodiments, the standardized data representation comprises a predetermined number of reserved fields in the fields for each monitored site belonging to the one or more monitored sites for future use.

In some embodiments, the system further includes a prediction circuit belonging to the one or more server computers, the prediction circuit configured to receive the standardized data representation as input, execute a first machine-learning algorithm on the standardized data representation to classify or predict events over a future observation period, and store the classification or prediction for the future observation period in an event database.

In some embodiments, the prediction circuit predicts preventive maintenance over a future observation period.

In some embodiments, the prediction circuit sends control signals to a selected set of sensors to change the parameters controlling the behavior of the sensors based on the classification or the prediction.

In some embodiments, the system includes a training circuit belonging to the one or more server computers configured to retrieve the prediction for a current observation period from the event database, compare the prediction with actual events occurring for the current observation period, and forming a difference vector in case the prediction does not match the actual events, and send the difference vector to the external monitor.

In some embodiments, the prediction circuit sends control signals to a selected set of sensors to change the parameters controlling the behavior of the sensors based on the classification or the prediction.

In some embodiments, the system further includes a training circuit belonging to the one or more server computers configured to retrieve the prediction for a current observation period from the event database, compare the prediction with actual events occurring for the current observation period, and forming a difference vector in case the prediction does not match the actual events, and send the difference vector to the external monitor.

In some embodiments, the training circuit improves upon future predictions by training the machine-learning algorithms of the prediction circuit by providing the difference vector as an input to the prediction circuit.

In some embodiments, a method includes receiving data, by one or more server computers through a network interface, for an observation period from one or more monitored sites, wherein at least one of the one or more monitored sites provides the data in a non-standardized format dependent on one or more alarm panels belonging to the one or more monitored sites, generating, by the one or more server computers, a standardized data representation of fixed length from the data as a security signature for each site belonging to the one or more monitored sites, and sending, by the network interface of the one or more server computers, the standardized data representation for each monitored site to an external monitor.

In some embodiments, the method further includes receiving a command from the external monitor, by the one or more server computers through the network interface, to compare the standardized data representation of fixed length belonging to a first site and to a second site, wherein the first site and the second site belong to the one or more monitored sites, and sending, by the one or more server computers, a result of the comparison of the standardized data representation of fixed length belonging to the first site and the second site to an external monitor.

In some embodiments, a computer program product tangibly stored on a non-transitory computer readable hardware storage device, the computer program product for generating a standardized representation of fixed length for events occurring at a monitored site, the computer program product including instructions to cause a processor to detect events in sensor data received from sensors deployed at the monitored site, calculate the number of occurrences of each event in the sensor data as a bag-of-words (BOW), calculate the count of the number of alarms raised at the monitored site, calculate the count of the number of affected zones from which the events, including the alarms for the monitored site were raised from, apply data labels as rules to run SQL query on the sensor data, and to capture patterns from the sensor data, and generate a security signature for the monitored site as a standardized representation of the events detected in the sensor data.

In some embodiments, the computer program product includes further instructions to cause a processor to predict or classify events over a future observation period based on the sensor data received from the monitored site.

In some embodiments, the computer program product includes further instructions to cause a processor to generate the standardized data representation to include a false alarm count field along with each field belonging to the plurality of fields, to indicate a count of false alarms associated with the event represented by the field.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Referring generally to the FIGURES, systems and methods for generating a security signature for events occurring at a monitored site over an observation period in a network-based, centralized security monitoring system are shown, according to various exemplary embodiments. In this regard, a security signature is a unique representation that describes the underlying properties, behaviors and features of a monitored site by capturing the events that occurred at the monitored site over an observation period. The security signature captures all events or a large portion of the events in some embodiments.

A network-based, centralized security monitoring system includes one or more monitored sites, which are connected to and communicate with a centralized security monitoring center. Each monitored site is equipped with one or more sensors to monitor various parameters of the monitored site, with each sensor monitoring one or more parameters, either continuously or periodically. The data from the sensors is collected by an alarm panel (or security system) at each monitored site. The alarm panel collects the sensor data from multiple sensors at each monitored site. In some embodiments, the alarm panel at a monitored site may communicate the events corresponding to the sensor data to server computers located within the centralized security monitoring system. In some embodiments, the server computers are located outside the premises of the centralized security monitoring system. In some embodiments, the server computers are located in the cloud. The server computers may control and/or operate the sensors at a monitored site by sending commands to the alarm panels. In some embodiments, the server computers send control signals to control the operation of specific sensors at a monitored site in response to the server computers recognizing a pattern in the event data collected from one or more sensors of a monitored site. In some embodiments, an example of a recognized pattern is a need for preventive maintenance, or the detection of an imminent security event. The event data that server computers use for analysis may consist of both historical data retrieved from an event database accessible to the server computers, and/or real-time data received from one or more alarm panels. The event data received by the server computers may take various forms. The event data includes raw or processed sensor readings, alarm data, and readings of various other parameters of the centralized security monitoring system.

In some embodiments, the systems and methods discussed herein provide a way for using both historical data retrieved from an event database, and/or real-time data collected by a centralized security monitoring system to build a security signature for a monitored site. In some embodiments, the generation of a security signature for each of the monitored sites provides a standardized or universal data model that confers an advantage of facilitating the comparison and combination of security signatures from different monitored sites, even though the event data at the individual sites may have been captured using different types of alarm panels or security systems. In some embodiments, the data model is in a Brick or Haystack schema.

In some embodiments, the systems and methods discussed herein provide a way for the event data that is generated by the events occurring at the monitored sites to be used to generate a security signature for each of the monitored sites from which such data is collected. Thus, the security signature captures all the events, or substantially all the events that occurred at the monitored site during an observation period.

In some embodiments, natural language processing algorithms may be used to parse free-text data collected from one or more sensors deployed at a particular monitored site into a form that is then be used to train machine learning models to make use of the event data for predictive analysis. In some embodiments, the systems and methods discussed herein provide techniques for creating security signatures for each monitored site in a form that is suitable for input to machine learning algorithms for predictive security and anomaly detection.

Centralized Security Monitoring System with Security Signature Generation

Referring now to FIGS. 1-4, an exemplary centralized security monitoring system (CSM) in which the systems and methods of the present invention can be implemented are shown, according to an exemplary embodiment. In some embodiments, a security signature is generated for each site monitored by the CSM. In some embodiments, the security signature consists of a set of numbers separated by a chosen separator.

Figure 1:
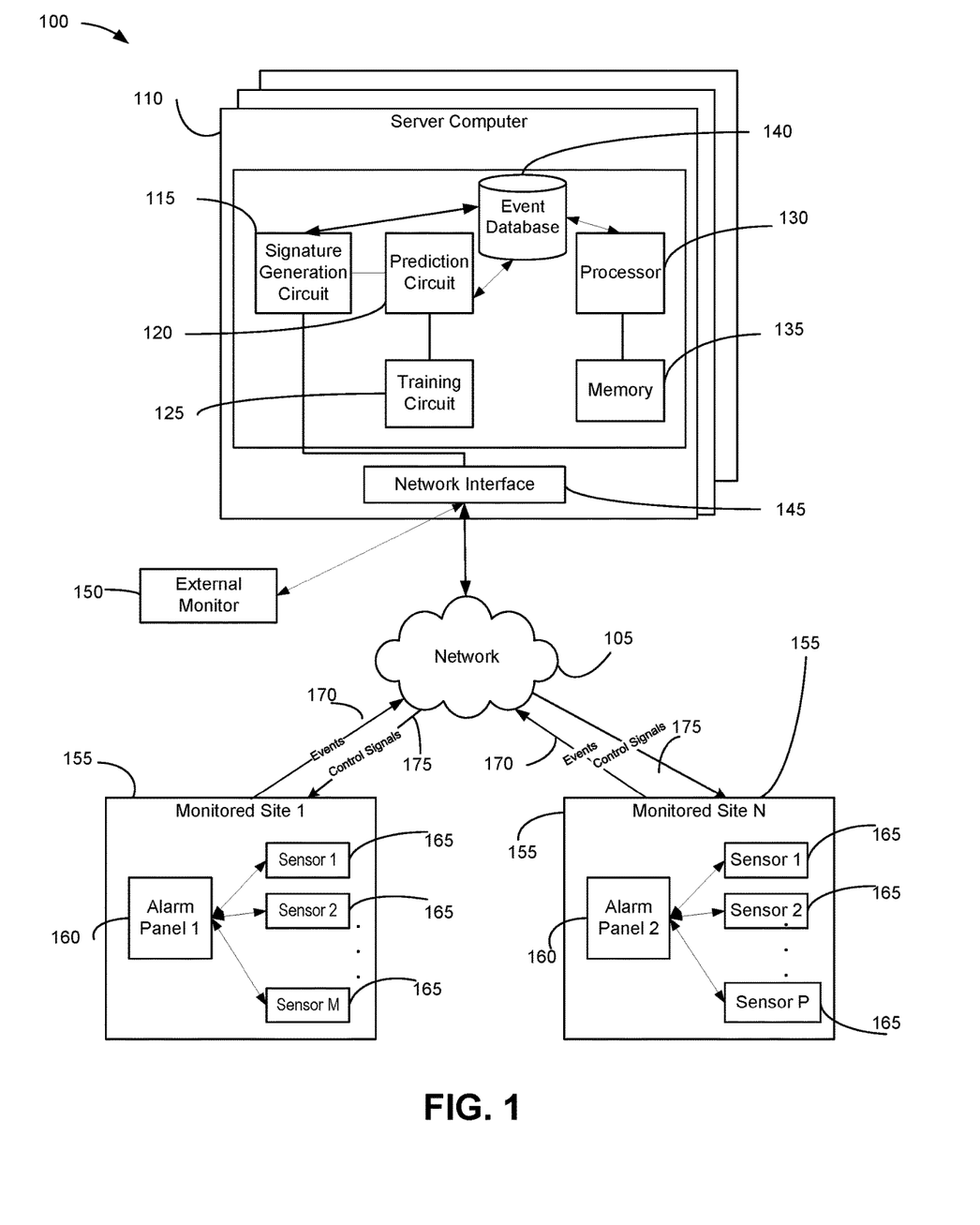
FIG. 1 is a network-based centralized security monitoring system that generates a security signature for a monitored site, according to an exemplary embodiment.

Referring now to FIG. 1, a CSM system 100 configured to generate security signatures for each one of multiple sites 155 monitored by the CSM 100 is shown, according to an exemplary embodiment. The system 100 consists of one or more server computers 110, an external monitor 150, a network 105, and one or more monitored sites 155.

A monitored site 155 is a building or a set of buildings, in which multiple sensors 165 are deployed to monitor various parameters of the environment of the building. A monitored site 155 also consists of an alarm panel 160 (or security system), which are communicatively coupled to the sensors 165. In some embodiments, the alarm panel 160 controls the operation of the sensors 165, and/or collects data from the sensors 165, either continuously or periodically. In some embodiments, an example of a monitored site 155 may be an office, a store, a mall, a factory, a station, an airport, a sky rise building, an apartment building, and a school or college or office campus. It should be understood that a monitored site 155 may consist of other types of buildings other than the ones mentioned as examples.

As alluded to before, each monitored site 155 includes at least one alarm panel 160, to which one or more sensors 165 are communicatively coupled. Each monitored site 155 generates events 170, which are representative of a condition detected by one or more sensors 165, or are indicative of various parameters or service conditions that may exist at a monitored site 155. The events 170 generated by the alarm panel 160 may include event data, alarm data, and free-form textual data about various parameters or service conditions that may exist on a monitored site 155. The events 170 generated by the alarm panel 160 at each individual monitored site 155 are sent to a network interface 145 on a server computer 110 through a network 105. Not all events 170 communicated by the alarm panel 160 to the server computers 110 give rise to an alarm on the server computers 110.

Referring back to FIG. 1, an external monitor 150 is depicted, which is a device that facilitates two-way communication with the server computer 110 through the network interface 145 on the server computer 110. In some embodiments, the external monitor 150 not only receives information to display or capture, but also provides the ability to the user of the external monitor to send commands to the server computer 110 to direct the operations of sensors at a monitored site 155. In this regard, the external monitor should be understood to comprise input and output devices (not shown), which may take the form of a touch screen keyboard, mouse, a Graphical User Interface (GUI), etc. In some embodiments, the external monitor 150 may be a laptop, a tablet, a smart phone, a desktop, or a handheld device.

Referring back to FIG. 1, a network 105 communicatively and operatively couples multiple nodes, for example, the monitored sites 155, external monitor 150, and the server computers 110 to facilitate the transfer of communication between the nodes. In some embodiments, the network 105 may include one or more of the Internet, cellular network, Wi-Fi, Wi-Max, a proprietary banking network, any other type of wired or wireless network, or a combination of wired and wireless networks. In some other embodiments, the system 100 may facilitate a direct communication between any of the nodes shown as coupled through the network 105 in the example embodiment of FIG. 1.

Referring back to FIG. 1, the server computer 110 includes, besides the network interface 145, a signature generation circuit 115, a prediction circuit 120, a training circuit 125, one or more processors 130, a non-transitory memory 135, and an event database 140. In some embodiments, the processing circuits 115, 120, and 125 may include a processor 130 and memory 135 (not shown), that is, the processor 130 and the memory 135 are part of each processing circuit 115, 120, and 125.

The network interface 145 is structured to enable the exchange of communications (e.g., signals, information, data, etc.) between the server computers 110 and other nodes, for example, the monitored sites 155, and external monitor 150, via the network 105. Accordingly, the network interface 145 may be or include a cellular modem, a Wi-Fi transceiver, a Bluetooth transceiver, a Bluetooth beacon, a radio-frequency identification (RFID) transceiver, a near-field communication (NFC) transmitter, and/or any other network chip or arrangement for enabling communications and at least some of the functions described herein. In some embodiments, the network interface 145 may include cryptography capabilities to establish a secure or relatively secure communication session.

As used herein, the term "circuit", as applied with the processing circuits 115, 120, and 125, may include hardware structured to execute the functions described herein. In some arrangements, each respective "circuit" may include machine-readable media for configuring the hardware to execute the functions described herein. The circuit may be embodied as one or more circuitry components including, but not limited to, processing circuitry, network interfaces (shown as separate components in diagram of FIG. 1), peripheral devices, input devices, output devices, sensors, etc. In some arrangements, a circuit may take the form of one or more analog circuits, electronic circuits (e.g., integrated circuits (IC), discrete circuits, system on a chip (SOCs) circuits, etc.), server circuits, telecommunication circuits, hybrid circuits, and any other type of "circuit."

The one or more processors 130 are communicatively coupled to one or more memory or memory devices 135. In this regard, each of the one or more processors 130 may execute instructions stored in the memory 135, or may execute instructions otherwise accessible to the one or more processors. Each of the one or more processors 130 of each system may be constructed in a manner sufficient to perform at least the operations described herein. In some arrangements, each of the one or more processors 130 of each system may be shared by multiple circuits (e.g., circuit A and circuit B may comprise or otherwise share the same processor which, in some example arrangements, may execute instructions stored, or otherwise accessed, via different areas of memory). Alternatively, or additionally, each of the one or more processors 130 of each system may be structured to perform or otherwise execute certain operations independent of one or more co-processors. In other example arrangements, two or more processors may be coupled via a bus to enable independent, parallel, pipelined, or multi-threaded instruction execution. Each processor 130 may be implemented as one or more general-purpose processors, application specific integrated circuits (ASICs), field programmable gate arrays (FPGAs), digital signal processors (DSPs), or other suitable electronic data processing components structured to execute instructions provided by memory. Each of the one or more processors of processors 130 of each system may take the form of a single core processor, multi-core processor (e.g., a dual core processor, triple core processor, quad core processor, etc.), microprocessor, etc. In some arrangements, each of the one or more processors 130 may be a part of a cloud based processor or processing system. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Each memory device 135 may include non-transient volatile storage media, non-volatile storage media, non-transitory storage media (e.g., one or more volatile and/or non-volatile memories), etc. In some arrangements, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other arrangements, the volatile storage media may take the form of RAM, TRAM, ZRAM, etc. Combinations of the above are also included within the scope of machine-readable media. In this regard, machine-executable instructions comprise, for example, instructions and data which cause a computer or special purpose processing machines to perform a certain function or group of functions. Each memory device 135 may be operable to maintain or otherwise store information relating to the operations performed by one or more associated circuits, including processor instructions and related data (e.g., database components, object code components, script components, etc.), in accordance with the example arrangements described herein.

Figure 4:
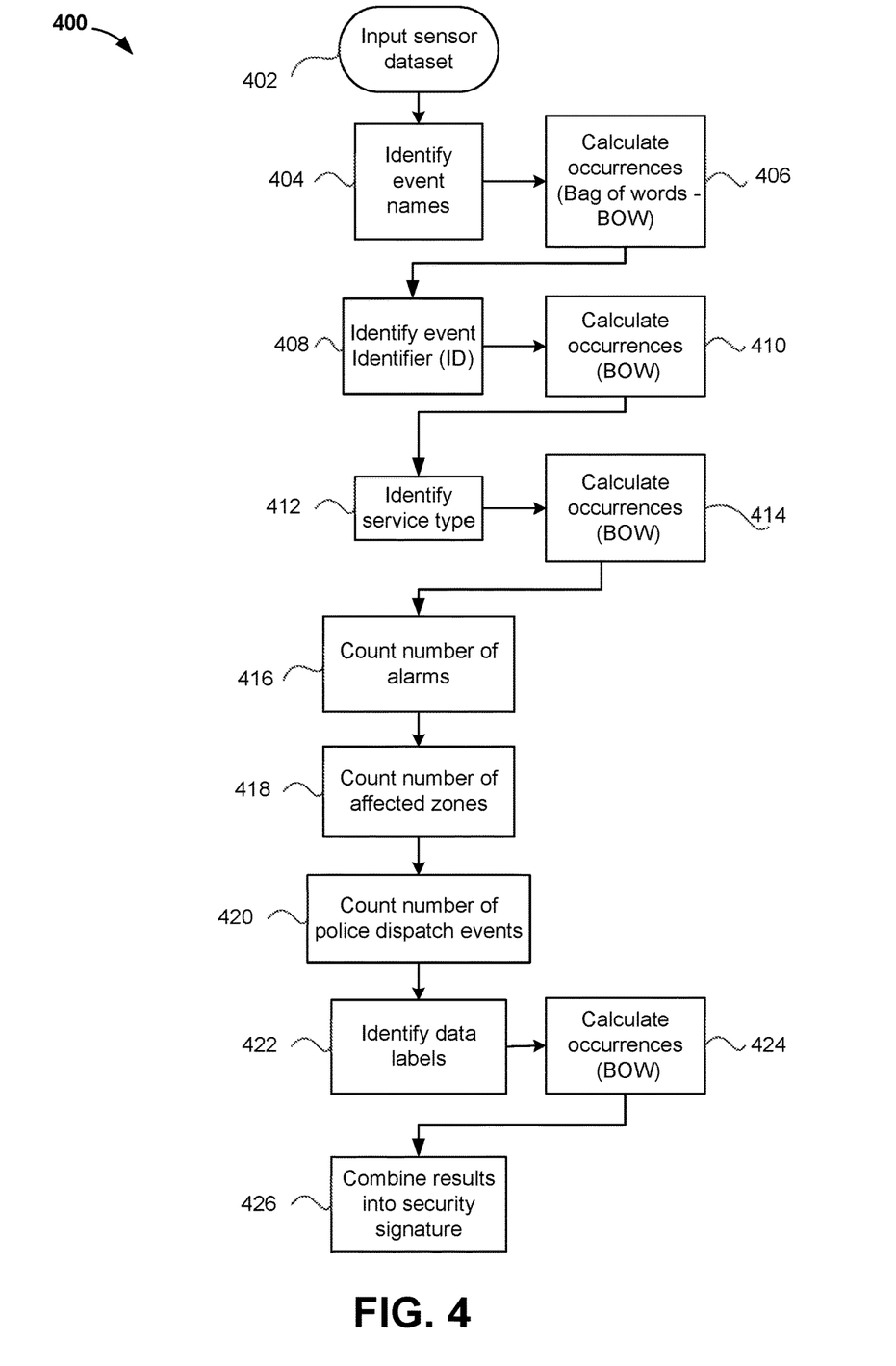
FIG. 4 is a flow diagram of a process of creation of a security signature, according to an exemplary embodiment.

The signature generation circuit 115 is a component of the server computer 110, which is responsible for generating a security signature for a monitored site 155 upon receiving event data from the monitored site 155 for an observation period. The signature generation circuit 115 receives all the events 170 generated per monitored site 155, and generates a fixed length security signature as a unique representation that describes the underlying properties, behaviors and features of each individual monitored site. In some implementations, the generated security signature is numerical. The signature generation circuit 115 uses alarm data, event data, and a number of other parameters to build the security signature as a standardized data representation of fixed length. The signature generation circuit 115 normalizes all possible events that may occur at each of the monitored sites 155, that is, it forms a superset of all event types supported by any of the monitored sites 155. In some embodiments, not all event types may be reported for every individual monitored site 155, since it is possible for an individual monitored site to have a type of alarm panel 160 which does not produce the same number and types of events as yet another type of alarm panel 160. A standardized data representation of a security signature encompassing various event types ensures that the representation will be of a fixed length, regardless of the monitored site from which the events 170 are collected (and the alarm panel 160 deployed at that monitored site 155). In some embodiments, providing a universal data model for the site-specific security signature confers an advantage that the standardized representation facilitates the comparison and combination of security signatures of different monitored sites 155 using different types of alarm panels 160 in generating the events 170 for each monitored site 155. The signature generation circuit 115 uses the steps in the method 400 (described below) to generate the fixed length, standardized representation of the security signature for each monitored site 155 from which event data is received by the server computers 110. For some of the parameters, the signature generation circuit 115 determines the count of bag-of-words for the parameters included in the event data during the generation of the fixed-length, standardized representation of the security signature for a monitored site 155. In some embodiments, the signature generation circuit 115 executes natural language processing algorithms to parse free-text data collected from one or more sensors 165 deployed at a particular monitored site 155 into a form that is suitable to provide as input to machine learning algorithms (for example, an alphanumeric text with predetermined separators which are unlikely to appear in the data).

The prediction circuit 120 is a component of the one or more server computers 110. The prediction circuit 120 utilizes the fixed length, standardized representation of the security signature produced by the signature generation circuit 115 to provide further analysis of the event data contained in the standardized representation. In some embodiments, the prediction circuit 120 executes a machine-learning algorithm on the standardized event data representation to classify or predict events over a future observation period (and stores the classification or prediction for the future observation period in an event database). In some embodiments, the prediction circuit 120 predicts events likely to occur over the next day, that is, the prediction circuit 120 runs a daily snapshot on event data collected from chosen monitored sites 155 for predictive analysis. In some embodiments, the analysis may be performed for a different observation period than one day, i.e., the observation period may be defined in hours, or weeks, or another different unit of time. In some embodiments, the prediction circuit 120 predicts preventive maintenance based on the analysis of the standardized event data representation. In some other embodiments, the prediction circuit 120 modifies the behavior of sensors at some monitored sites by sending control signals to the sensors (though the alarm panel 160 in the monitored sites 155) based on logic built into the prediction circuit 120 that determines the imminent occurrence of future security events by recognizing a pattern in the events occurring at the present time. The modification of the operation of one or more sensors by the prediction circuit 120 may involve waking up sensors 165 from sleep, or modifying the type or amount or duration of the data collected by the one or more sensors 165.

The training circuit 125 is a component of the one or more server computers 110. The functionality of the training circuit 125 is to improve the working of the prediction circuit 120 by comparing the predictions generated in the past by the prediction circuit 120 for a future time period with the actual events that occur in the time period corresponding to the time period for which the predictions had been generated. In this regard, the actual events may be thought of as invented truths, against which the predicted events can be compared. The training circuit 125 generates a difference vector by comparing the predicted events with the standardized event data representation generated for the corresponding time period for which the prediction circuit 120 had predicted the events (i.e., the invented truth). In some embodiments, the difference vector is a list of differences between the prediction of the prediction circuit 120 for the future time period and the actual events that occurred during the time period for which the predictions had been generated. The training circuit 125 provides the difference vector to the prediction circuit 120 to enable the machine learning algorithms in the prediction circuit 120 to improve upon future predictions. In some embodiments, the prediction circuit 120 effects improvements in future predictions by modifying the machine language algorithms for future predictions in response to the feedback from the training circuit 125 such that the difference vector is substantially reduced to a null (i.e., with multiple iterations, the feedback loop between the training circuit 125 and the prediction circuit 120 substantially eliminates the difference between the predictions and the invented truths).

The event database 140 is structured to hold, store, categorize, and otherwise serve as a repository for information, and selectively provide access to the stored information. For example, the event database 140 is structured to selectively store and provide access to information relating to the fixed length, standardized representation of the security signature of a monitored site 155 to the signature generation circuit 115, or the prediction circuit 120, or the training circuit 125. The event database 140 may be used to store the difference vector produced by the training circuit 125, and used later by the prediction circuit 120.

Figure 2:
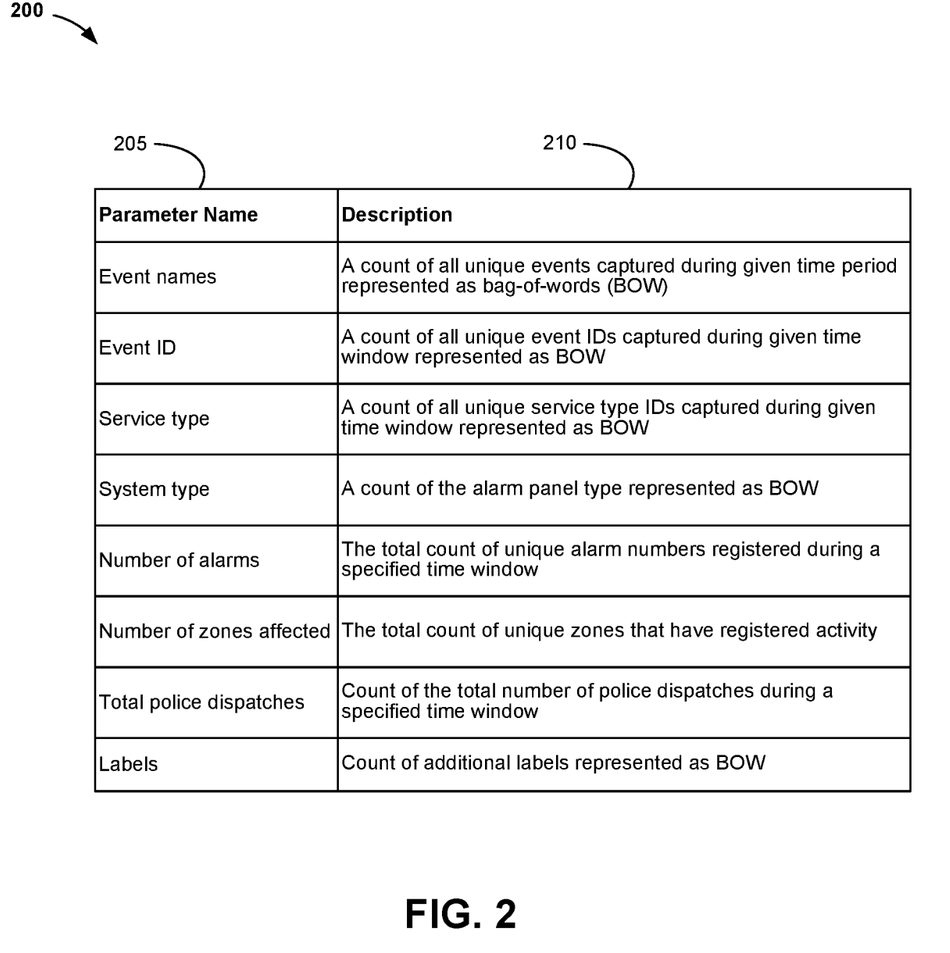
FIG. 2 is a table of parameters collected from security equipment by the system of FIG. 1 for generating a security signature for a monitored site, according to an exemplary embodiment.

Now referring to FIG. 2, an example of the type of parameters 200 that are received by the CSM from an example monitored site 155 is depicted. The parameters are representative of events detected by the sensors at a monitored site 155, e.g., a burglary. An event is generated by the alarm panel situated at the monitored site 155. An event is generated when some sensor is activated, for example, due to disconnection of a sensor in doors, or due to motion activation of a sensor.

The parameter names 205 represent the names of parameters of the event data fields. The description 210 provide an explanation about each individual parameter that is collected from an example monitored site 155. For example, parameter name "Event names" represents a count of all unique events captured during a given a time period represented as bag-of-words (BOW), while parameter name "Event ID" represents a count of all unique event IDs captured during a given time window represented as BOW. Parameter name "Service type" represents a count of all unique service type IDs captured during a given time window represented as BOW. Parameter name "System type" represents a count of the alarm panel type represented as BOW. Parameter name "Number of alarms" represents the total count of unique alarm numbers registered during a specified time window. Parameter name "Number of zones affected" represents the total count of unique zones that have registered activity. Parameter name "Total police dispatches" represents a count of the total number of police dispatches during a specified time window. Parameter name "Labels" represents a count of additional labels represented as BOW, wherein a label is a rule used for running an SQL query on the collected sensor data, and capturing specific patterns from the sensor data.

Figure 3:
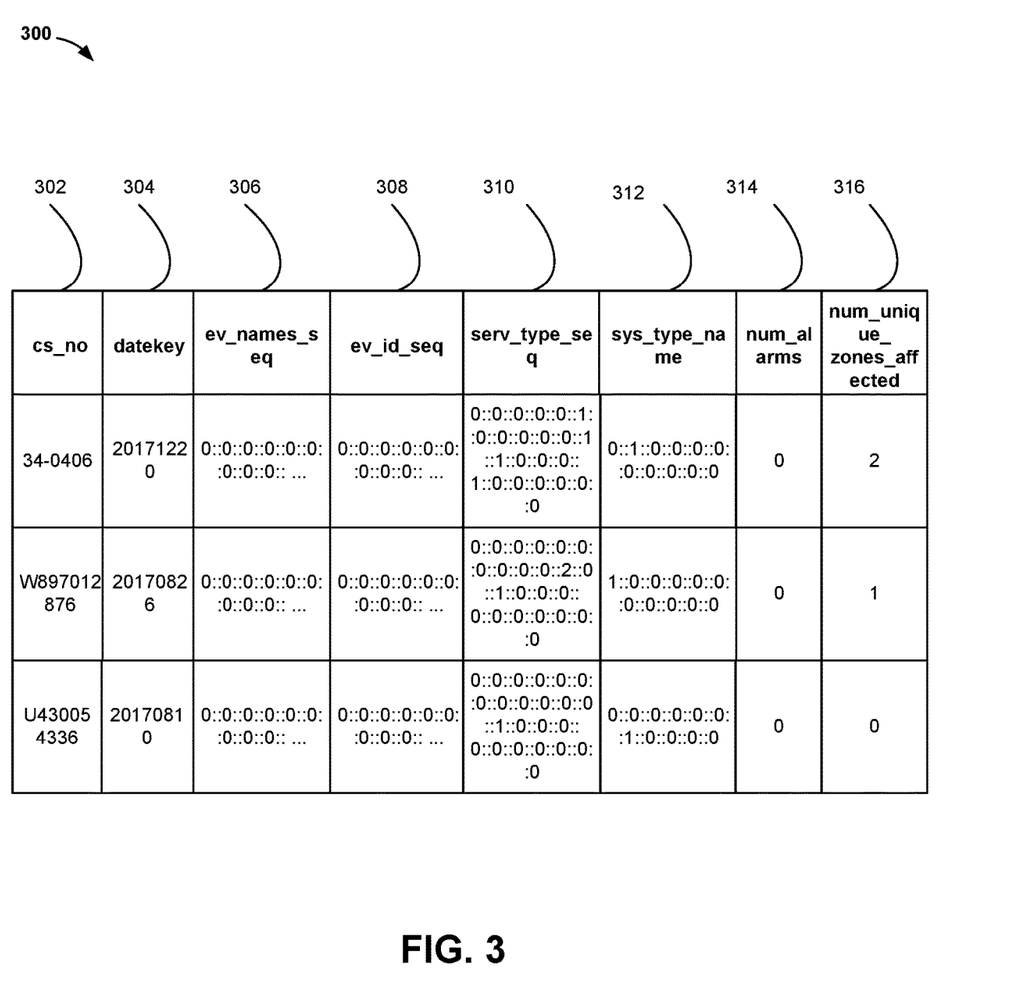
FIG. 3 is security signature in a standardized data representation of fixed length with a sparse representation format that can be generated by the system of FIG. 1, according to an exemplary embodiment.

FIG. 3 is an example of a uniform data representation 300 generated by the signature generation circuit 115 based on example parameters that are collected at a monitored site 155, according to an example embodiment. The column "cs_no" 302 represents an alphanumeric identification of a monitored site 155 (which is akin to a site identifier). The column "datekey" 304 represents the date of data collection. The column "ev_names_seq" 306 represents a BOW for the event name parameter type. The column "ev_seq_id" 308 represents a BOW for the event id parameter type. The column "serv_type_seq" 310 represents a BOW for the service type parameter type. The column "sys_type_name" 312 represents the system type parameter, that is, "sys_type_name" 312 indicates the type of alarm panel that is installed at the monitored site 155. In one embodiment, the "sys_type_name" is normalized on a per-manufacturer basis, hence, there is one "sys_type_name" 312 for any alarm panel made by a unique manufacturer. The column "num_alarms" 314 represents the number of alarms raised from a particular monitored site 155. The column "num_unique_zones_affected" 316 represents the number of affected zones from which the events (including those not giving rise to alarms) were raised from a particular monitored site 155. It should be understood that the above described columns (or fields) are representative examples of the types of parameters that may be collected at each of the monitored sites 155, and are non-limiting in nature. In some embodiments, the total number of columns (that is, the number of parameters for which event data is collected at a monitored site 155) may be 2500 or more.

FIG. 4 is a flowchart depicting a method 400 for the process of generation of a security signature for a monitored site 155, according to an exemplary embodiment. Method 400, as described by the following steps, provides a technical improvement by enabling a fixed-length, uniform representation of the security signature to be generated from security events collected from monitored sites 155 deploying alarm panels 160 from different manufacturers. The uniform representation of the security signature enables the comparison of the security signature across monitored sites deploying alarm panels made by different manufacturers.

At step 402, the method receives inputs from an alarm panel 160 about the set of events that occurred at a monitored site 155. The events that occurred over an observation period are reported at this step. The alarm panel 160 collects the set of events from one or more sensors 165 deployed at the monitored site 155.

At step 404, the method identifies "event names" from the event data received from the sensors 165. The parameter "event names" is an example parameter that is collected at the monitored site 155.

At step 406, the method calculates the number of occurrences of "event names" as a bag-of-words (BOW). The BOW counter represents the number of times that the event occurred during the observation period.

At step 408, the method identifies "event IDs" from the sensor data. In some embodiments, "event IDs" for an event at a first site may be different than the "event IDs" for a second site, even though "event name" may be the same at the two monitored sites 155. This may be due to alarm panel manufacturers being different for the two monitored sites.

At step 410, the method calculates the number of occurrences of "event IDs" as a BOW. The BOW counter represents the number of times that the event occurred during the observation period.

At step 412, the method identifies the "service type" from the event data. In operation, all the steps of method 400 are performed by the signature generation circuit 115.

At step 414, the method calculates the number of occurrences of "service type" as a BOW. In some embodiments, this parameter is a count of all unique service types that were captured during the observation period represented as a BOW.

At step 416, the method calculates the count of the number of alarms raised at the monitored site 155. In some embodiments, this parameter represents the total count of unique alarm numbers registered during an observation period.

At step 418, the method calculates the count of the number of affected zones from which the alarms at step 416 from a particular monitored site 155 were raised from. In some embodiments, this parameter represents the total count of unique zones that have registered activity during an observation period.

At step 420, the method calculates the count of the number of events that resulted in police being dispatched to the monitored site 155. In some embodiments, this example parameter represents the total count of police dispatches during an observation period.

At step 422, the method identifies "data labels" which are the rules used for running SQL query on the collected sensor data, and capturing patterns from the sensor data.

At step 424, the method calculates the number of occurrences of "data labels" as a BOW. In some embodiments, this example parameter represents the total count of the number of occurrences of "data labels" during an observation period.

At step 426, the method consolidates the parameters identified or generated in the previous steps to generate a security signature for the particular monitored site 155. In some embodiments, this includes taking into account the corresponding bag-of-word values for many of the parameters.

In operation, the various steps of method 400 are performed by the signature generation circuit 115 shown in FIG. 1. The signature generation circuit 115 computes the above counts for the aforementioned parameters (including BOW for the counts for some parameters, as necessary). It should be understood that the list of parameters and the corresponding counts computed in the various steps of method 400 are non-limiting examples, according to an exemplary embodiment. In some embodiments, the number and type of parameters may include a larger number of parameters. For example, in one embodiment, the number of parameters is 2500, or more. In the example embodiment of FIG. 3, the security signature is generated as a uniform or standardized data representation for each monitored site 155 by combining the computed event counts into a fixed-length string of alphanumeric text, with each event count in the string separated from the next by a predetermined separator. The predetermined separator is chosen such that the separator is unlikely to appear in the computed event counts, with the separator serving to break up the counts for each individual parameter computed by method 400. Thus, the separators facilitate a representation whereby all the event counts during an observation period form part of a single, fixed-length string representing the standardized security signature for a monitored site 155. In the example of FIG. 3, the separator between the counts of different parameters is a "semi-colon", which is a character unlikely to occur in the counts of events corresponding to the parameters of a system. In some embodiments, the uniform data representation is provided as a sparse representation, meaning that all the parameter event counts are included in the uniform representation for each monitored site 155, even the event counts are zero for many of the parameters (in other words, those events did not occur even once during the observation period). The sparse representation produces a security signature that includes the event counts for all possible events occurring at a monitored site 155, and is a fixed-length format. As alluded to before, the example representation 300 in FIG. 3 represents a fixed-length security signature, with the semi-colon serving as the separator.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain unction or group of functions.

Although the figures show a specific order of method steps, the order of the steps can differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A security monitoring system, the security monitoring system comprising one or more memory devices configured to store instructions thereon that, when executed by one or more processors, cause the one or more processors to:
   receive a plurality of parameter data elements for a plurality of parameter types from a monitored site, wherein each of the plurality of parameter data elements comprises one or more characters;
   determine, for each of the plurality of parameter types, a number of occurrences of a plurality of different character groups in the plurality of parameter data elements of each of the plurality of parameter types;
   generate a count structure for each of the plurality of parameter types, the count structure indicating the number of occurrences of the plurality of different character groups in the plurality of parameter data elements for one of the plurality of parameter types; and
   generate a security signature for the monitored site, the security signature comprising the count structure for each of the plurality of parameter types.

2. The system of claim 1, wherein the instructions cause the one or more processors to:
   receive event data from the monitored site, the event data being collected from one or more sensors at the monitored site;
   calculate a zone count of a number of affected zones of the monitored site experiencing activity based on the event data; and
   cause the security signature to include the zone count.

3. The system of claim 1, wherein the security signature further comprises an alarm count field indicating a number of alarms occurring at the monitored site.

4. The system of claim 1, wherein the count structure for each of the plurality of parameter types is a bag-of-words (BOW) data structure.

5. The system of claim 1, wherein the count structure for each of the plurality of parameter types represents a number of times that a particular event represented by the one or more characters occurred at the monitored site during an observation period.

6. The system of claim 5, wherein the observation period is either a first number of hours, a second number of days, or a third number of weeks.

7. The system of claim 1, wherein the instructions cause the one or more processors to:
   receive a plurality of other security signatures, each of the plurality of other security signatures associated with one of a plurality of other monitored sites;
   execute a machine-learning algorithm on the security signature and the plurality of other security signatures to predict one or more events over a future observation period; and
   store the one or more events predicted over the future observation period in an event database.

8. The system of claim 7, wherein the one or more events indicate equipment failure, wherein the instructions cause the one or more processors to:
   determine one or more predictive maintenance actions to perform to prevent the one or more events; and
   store the one or more predictive maintenance actions in the event database.

9. The system of claim 7, wherein the instructions cause the one or more processors to communicate signals to one or more sensors in the monitored site to change one or more operational parameters of the one or more sensors.

10. The system of claim 7, wherein the instructions cause the one or more processors to:
retrieve a prediction for a current observation period from the event database;
compare the prediction with one or more actual events occurring during the current observation period to determine whether the prediction is different than the one or more actual events; and
send an indication of the prediction being different than the one or more actual events to an external monitor.

11. The system of claim 10, wherein the instructions cause the one or more processors to: execute machine-learning algorithm based on the indication of the prediction being different than the one or more actual events.

12. A method comprising:
receiving, by a processing circuit, a plurality of parameter data elements for a plurality of parameter types from a monitored site, wherein each of the plurality of parameter data elements comprises one or more characters;
determining, by the processing circuit, for each of the plurality of parameter types, a number of occurrences of a plurality of different character groups in the plurality of parameter data elements of each of the plurality of parameter types;
generating, by the processing circuit, a count structure for each of the plurality of parameter types, the count structure indicating the number of occurrences of the plurality of different character groups in the plurality of parameter data elements for one of the plurality of parameter types; and
generating, by the processing circuit, a security signature for the monitored site, the security signature comprising the count structure for each of the plurality of parameter types.

13. The method of claim 12, further comprising:
receiving, by the processing circuit, event data from the monitored site, the event data being collected from one or more sensors at the monitored site;
calculating, by the processing circuit, a zone count of a number of affected zones of the monitored site experiencing activity based on the event data; and
causing, by the processing circuit, the security signature to include the zone count.

14. The method of claim 12, wherein the security signature further comprises an alarm count field indicating a number of alarms occurring at the monitored site.

15. The method of claim 12, wherein the count structure for each of the plurality of parameter types is a bag-of-words (BOW) data structure.

16. The method of claim 12, further comprising:
receiving, by the processing circuit, a plurality of other security signatures, each of the plurality of other security signatures associated with one of a plurality of other monitored sites;
executing, by the processing circuit, a machine-learning algorithm on the security signature and the plurality of other security signatures to predict one or more events over a future observation period; and
storing, by the processing circuit, the one or more events predicted over the future observation period in an event database.

17. The method of claim 12, wherein the count structure for each of the plurality of parameter types represents a number of times that a particular event represented by the one or more characters occurred at the monitored site during an observation period.

18. The method of claim 17, wherein the observation period is either a first number of hours, a second number of days, or a third number of weeks.

19. One or more non-transitory computer readable medium storing instructions thereon that, when executed by one or more processors cause the one or more processors to:
receive a plurality of parameter data elements for a plurality of parameter types from a monitored site, wherein each of the plurality of parameter data elements comprises one or more characters;
determine, for each of the plurality of parameter types, a number of occurrences of a plurality of different character groups in the plurality of parameter data elements of each of the plurality of parameter types;
generate a count structure for each of the plurality of parameter types, the count structure indicating the number of occurrences of the plurality of different character groups in the plurality of parameter data elements for one of the plurality of parameter types; and
generate a security signature for the monitored site, the security signature comprising the count structure for each of the plurality of parameter types.

20. The one or more computer readable medium of claim 19, wherein the count structure for each of the plurality of parameter types is a bag-of-words (BOW) data structure.

* * * * *